United States Patent [19]

Wallquist et al.

[11] 4,306,580
[45] Dec. 22, 1981

[54] OVERFLOW RETURN TANK

[75] Inventors: Sven Wallquist; Rune Sund, both of Halmstad, Sweden

[73] Assignee: Haldex AB, Halmstad, Sweden

[21] Appl. No.: 68,652

[22] Filed: Aug. 22, 1979

[30] Foreign Application Priority Data

Mar. 19, 1979 [SE] Sweden ............... 7902472

[51] Int. Cl.³ ............................ F16K 31/20
[52] U.S. Cl. ................... 137/192; 137/451; 251/DIG. 2
[58] Field of Search ............. 137/192, 202, 451, 429, 137/430; 251/357, 358, DIG. 2

[56] References Cited

U.S. PATENT DOCUMENTS

| | | | |
|---|---|---|---|
| 1,940,007 | 12/1933 | Moore | 137/202 |
| 3,199,526 | 8/1965 | Pall | 137/192 |
| 3,418,789 | 12/1968 | Hoffman | 137/195 X |
| 4,082,106 | 4/1978 | Butcher | 137/451 X |

Primary Examiner—Alan Cohan
Attorney, Agent, or Firm—Sherman & Shalloway

[57] ABSTRACT

An overflow return tank, especially for receiving return fuel at internal combustion engines with fuel gauge, comprising a receptacle (20, 21, 22) with an inlet (23) located upwardly for a return flow and an outlet (25) and an air bleed hole (24), and with a float (30) located within the receptacle for controlling a valve (26, 36, 31a) located at the outlet of the receptacle. The valve comprises a soft, elastic diaphragm (36), which is connected to the float (30) and upon lifting of the float gradually exposes the outlet (25) by being bent, so that fuel can be taken out from the overflow return tank. Owing to the design of the valve only a small lifting force from the float is required, whereby the fuel amount in the overflow return tank can be maintained substantially constant even at great variations in the return flow. The overflow return tank, besides, can be given small dimensions. The overflow return tank further is provided with a member (44) to separate gas bubbles from the incoming return flow before the fuel again is discharged from the overflow return tank. Said member may be a pipe of fabric, through the walls of which the return flow can pass (FIG. 2).

10 Claims, 6 Drawing Figures

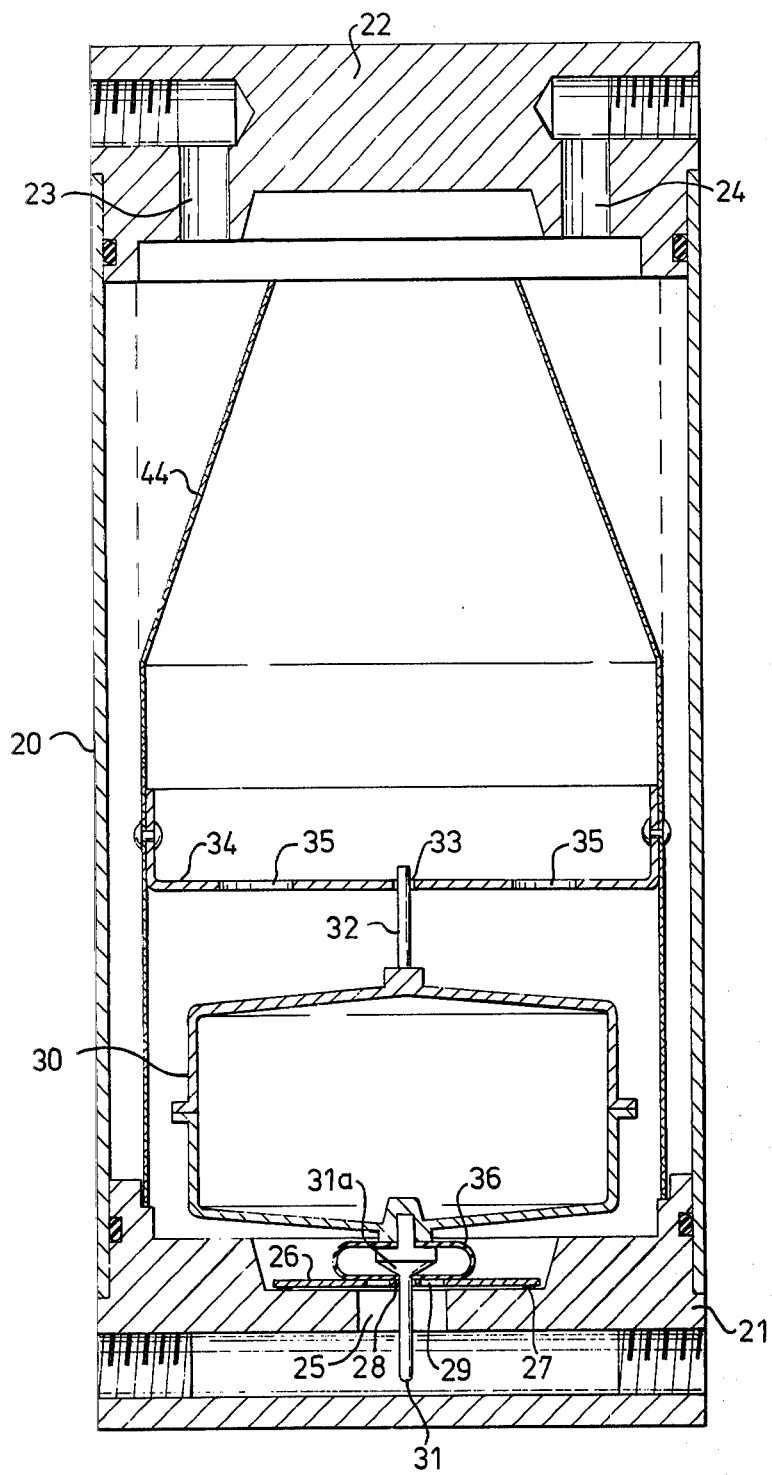

OVERFLOW RETURN TANK

This invention relates to an overflow return tank, which comprises a receptacle with an upwardly located inlet, a downwardly located outlet, a bleeder hole and a float within the receptacle, which controls a valve at the outlet of the receptacle. The overflow return tank primarily is intended to receive return fuel at internal combustion engines, which are equipped with a fuel gauge, for example engines for motor vehicles. The fuel pumps for internal combustion engines in motor vehicles deliver at certain operation conditions substantially more fuel to the engine than the engine consumes. The excess can amount to 90%. This excess must be returned in the form of return flow to the suction side of the fuel pump. Fuel gauges, where provided, normally are connected between the fuel tank and the fuel pump of the vehicle. When the return flow is returned from the engine to the fuel tank, the fuel will be measured incorrectly. Therefore, usually an overflow return tank is inserted in the return line from the engine for collecting the return flow and to return it to the suction side of the fuel pump after the fuel gauge, so that the return flow has no effect on the fuel measurement.

When measuring the fuel, it is often desirable also to measure the instantaneous fuel consumption and to indicate it by liter/hour or liter/mile. The speed of the vehicle hereby can be so adjusted that an optimum operation economy is obtained. For rendering this possible, however, the overflow return tank substantially must meet the conditions as follows:

1. The overflow return tank always must contain a constant fuel volume.
2. The overflow return tank must be capable of receiving the entire return flow between a minimum and a maximum, without causing a change in the volume contained in the overflow return tank.
3. The overflow return tank shall be capable of delivering a flow varying between minimum and maximum, without causing a change in the volume contained in the overflow return tank.
4. The overflow return tank shall be capable of separating gas and air bubbles from the fuel prior to its return to the fuel pump.

It is also desirable that the overflow return tank has a simple design, is reliable in operation and has a small volume, so that the tank easily can be housed in the vehicle.

The valve in the overflow return tank, thus, shall be capable to operate within a large flow range, because it must permit the entire return flow to pass through the valve. The valve, without appreciable throttling, must permit the passage of maximum flow and, at the absence of return flow, must be capable to close completely. Between these two extreme cases, the valve shall control continuously. The float, thus, must be capable of controlling the valve so as to be fully open and to seal completely. This is an object difficult to achieve, because at a forcefully sucking pump the difference in pressure between the upper and the lower side of the valve can be great, in special cases substantially as great as the atmospheric pressure. In view of the large return flow to be permitted to pass through the valve, the valve area must be relatively great, for example of the magnitude 50 mm$^2$, which requires a large float to produce sufficient lifting power, for example a float with a volume of the magnitude 1 liter.

In conventionally designed devices this problem has been solved by using a relatively small float and a lever. This has resulted in a relatively great upward and downward float movement and, in addition, a great liquid surface was obtained, due to the space requirement of the float and lever. This in its turn gave rise to a very great change in volume between fully closed valve and fully open valve. These known structures, therefore, did not satisfactorily meet the conditions stated above under 1-3. The condition 4, however, was easily satisfied, because the overflow return tank has contained much fuel, so that the bubbles had time enough to rise to the surface and to escape.

SUMMARY OF THE INVENTION

The present invention has the main object to provide an overflow return tank, which satisfactorily meets the conditions stated above, and which has a simple and reliable design as well as a small volume. This object is achieved by the present invention, in that the overflow return tank has been given the characterizing features defined in the attached claims.

Due to the fact that the valve comprises a soft and elastic diaphragm, which is connected to the float and upon lifting of the float gradually exposes the outlet by bending upward, only a relatively small force is required to open the valve. This force can be produced by a small float without lever means. The liquid surface thereby can be kept small, so that also the change in volume between fully open and fully closed valve will be small. The above conditions 1-3 thereby are well satisfied, especially when the intermediate space between the float wall and the inner wall of the receptacle is given smallest possible size. The above condition 4 then can be met by providing a suitable member at the inlet of the receptacle in such a manner, that the incoming flow is led downward along the member in the receptacle, whereby possible gas or air bubbles are removed.

BRIEF DESCRIPTION OF THE DRAWING

An embodiment of the return tank according to the invention is described in greater detail in the following, with reference to the accompanying drawings, in which FIG. 1 in a schematic way shows the connecting of an overflow return tank to a fuel feed system with a fuel gauge for motor vehicles, FIG. 2 is an enlarged cross-section of an overflow return tank with float.

DESCRIPTION OF THE INVENTION

Figure 1:
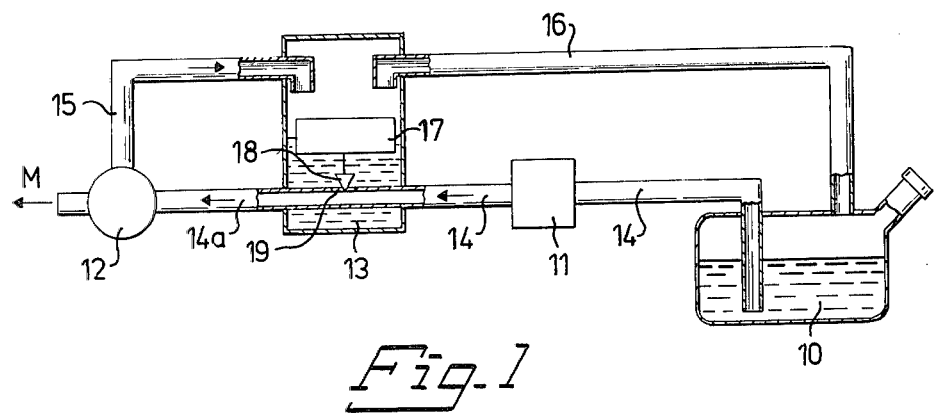

The fuel feed system shown in FIG. 1 comprises a fuel tank 10, a fuel gauge 11, a fuel pump 12 and an overflow return tank 13. The fuel gauge is connected to a pipe 14 between the fuel tank and the pump, and the overflow return tank is connected to a return line 15 from the pump 12. The overflow return tank also is connected to the upper portion of the fuel tank through an air bleed line 16. In the overflow return tank a float 17 is provided, which controls a valve 18 at an outlet 19 from the overflow return tank to the pipe 14 between the fuel gauge and the fuel pump. The portion of the pipe 14 extending between the overflow return tank and the pump is designated by 14a. The overflow return tank has the object to receive the return flow, which passes from the fuel pump through the line 15, and to return this flow to the feed pipe 14 at a point after the fuel gauge, seen in the flow direction, so that the fuel measurement is not affected by the return flow. The air bleed line 16 opens into the fuel tank, so that the return flow can be returned to the fuel tank, in the event that the valve in the return tank is stuck in closed position. In such a case the fuel measurement will not be correct. The following applies to the fuel pump:

$$\phi_{14a} = \phi_M + \phi_{15} \quad (1)$$

The following should apply to the overflow return tank:

$$\phi_{14a} = \phi_{15} + \phi_{14} \quad (2)$$

When in the equations (1) and (2) $\phi_{14a}$ is eliminated, one obtains:

$$\phi_M + \phi_{15} = \phi_{15} + \phi_{14}, \text{ i.e. } \phi_{14} = \phi_M$$

The fuel gauge, thus, measures the consumption flow. This applies when the fuel content in the overflow return tank is constant. When this is not the case, the measurements at times are wrong. When the level is permitted to rise, during the rising more fuel is taken from the tank than the engine consumes. During this time a specific fuel consumption (1/h or 1/mile) is measured which is higher than the real one. When the fuel level in the overflow return tank again descends, little or no fuel is taken from the tank. The consumption flow is taken from the excess in the overflow return tank. During this time a specific fuel consumption is measured which is lower than the real one.

FIG. 2 is a section through the overflow return tank with float. The overflow return tank consists of a receptacle, which is assembled of a cylindric pipe 20 with a lower portion 21 and an upper portion 22. The upper portion includes an inlet 23 for the return flow connected to the line 15 in FIG. 1, and an air bleed hole 24 connected to the air bleed line 16 in FIG. 1. Said outlet is an outlet aperture covered by a perforated plate 26, which together with an intermediate sealing ring 27 is attached to the lower portion. The perforated plate 26 is provided with a small central hole 28 and a plurality of greater holes 29 lying about the central hole. The outer holes are arranged symmetrically about the central hole on a circle line. The holes are dimensioned so as to permit flow through by the maximum return flow, which the overflow return tank is intended to be capable to receive. In the overflow return tank a float in the form of a hollow body 30 is located which is provided with a guide pin 31 projecting downward and a guide pin 32 projecting upward. Said guide pins are located along the vertical axis of the float and intended to render it possible to guide the float during its upward and downward movement in the overflow return tank. The lower guide pin 31 runs in the central hole 28 in the perforated plate, the diameter of which hole slightly exceeds the diameter of the guide pin. The upper guide pin 33 is guided in a corresponding hole 33 in a cover 34 inserted above the float at such a distance from the lower portion of the overflow return tank, that the float can move sufficiently in vertical direction to control the delivery of return flow from the overflow return tank between minimum and maximum as will be explained below. The cover also is provided with a plurality of large holes 35 to permit the passage of the return flow.

In order to enable the float 30 to control the passage of return flow between minimum and maximum, the float is provided at its lower portion with a valve means, which comprises a soft, elastic diaphragm 36 of rubber or similar material and a valve body 31a in the form of a truncated cone located on the guide pin 31. The diaphragm 36 is bent to substantially oval shape and attached to the lower surface of the float in such a manner, that it encloses the valve body. The diaphragm has a central portion, which is capable of covering the flow holes in the perforated plate even when the float is turned about its vertical central axis.

Figure 3:
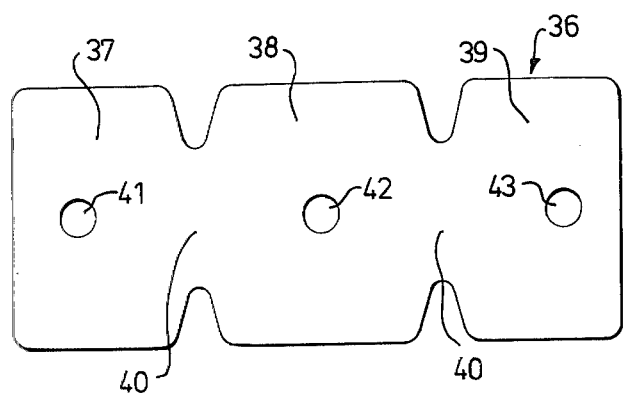
FIG. 3 shows the diaphragm used in the valve in unmounted state.
Figure 4:
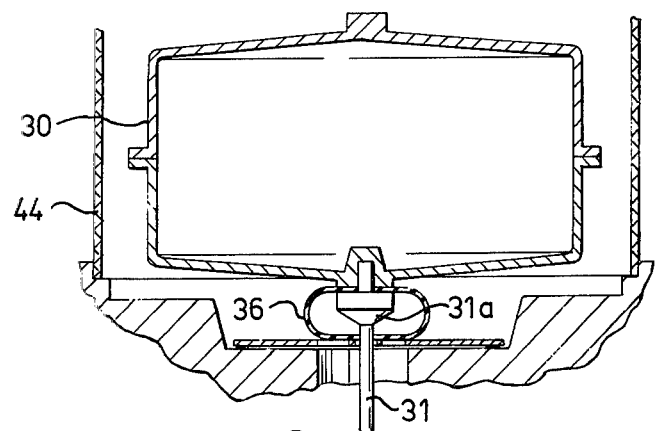
FIGS. 4-6 show the valve function at different float positions.

The diaphragm consists of a strip having the form shown in FIG. 3. The strip comprises three sections 37, 38, 39, the two outer ones 37, 39 of which are connected to the central section 38 by means of thin tongues or webs 40, which are intended to facilitate the bending of the strip, so that the central section has a substantially plane shape even after the strip has been bent and attached. Every section is provided with a through hole 41, 42, 43 for the guide pin, so that the diaphragm strip can be attached to the guide pin in the manner shown in FIG. 2. At least the hole 42 in the central section 38 has a diameter, which slightly exceeds the diameter of the guide pin, so that the central section of the diaphragm strip can move freely on the guide pin and be displaced along the same.

The overflow return tank is provided with a pipe 44 of fine-meshed fabric or fine-meshed network, which in the lower portion of the overflow return tank abuts the cylinder wall and in the upper portion of the overflow return tank tapers upwardly, so that it is located in the upper portion of the overflow return tank inside of the inlet mouth for the return flow. The return flow, therefore, falls freely through a short distance and then meets the fabric pipe, whereafter it flows along this pipe over a large area of the pipe down to the liquid level in the tank. The return flow flows as a thin film along the outer surface of the pipe without any further free fall. During this downward flow, at which the fuel also passes through the fabric pipe, gas or air bubbles possibly occurring in the fuel escape. The fabric pipe acts as a filter for gas and air bubbles.

Figure 5:
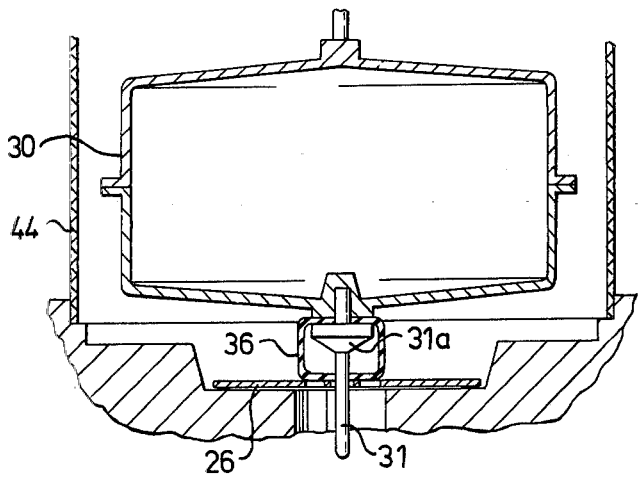
Figure 6:
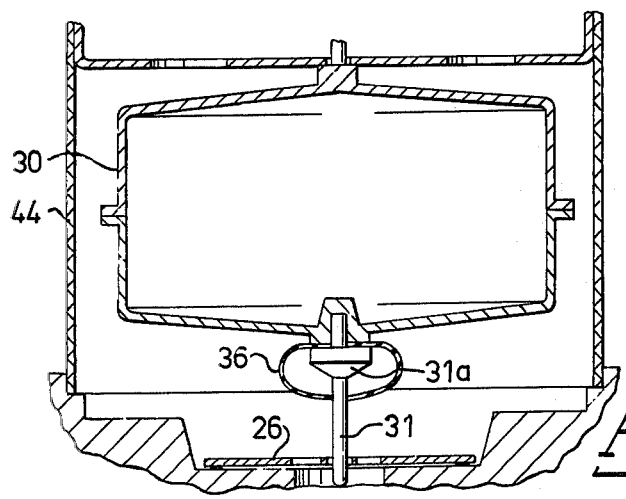

The function of the overflow return tank is described in the following with reference to FIGS. 2, 4, 5 and 6, which show the float-controlled valve means with different positions of the float. When the float is in the position shown in FIG. 2, the valve is completely closed, because the valve diaphragm is pressed against the perforated plate by the weight of the float and thereby closes the holes in said plate. The central hole for the guide pin through the perforated plate and the central section of the diaphragm is closed by the conical valve body located on the guide pin. The liquid surface in the overflow return tank then is at the lowest level, and no return flow enters the tank. When return flow starts flowing into the tank, it is freed from bubbles while passing along the fabric pipe as described above and then raises the liquid level in the tank, whereby the float starts being lifted upward. Due to the fact that the cross-sectional area of the float substantially is of equal size as the cross-sectional area in the overflow return tank, the gap between the float and the inner wall of the tank is very small, so that only a small added flow is required for causing the float to start lifting. At this inital lifting first the hole at the guide pin is opened, because the conical valve body is rigidly connected to the guide pin and accompanies the same at the lifting of the float. Hereby the pressure difference above the diaphragm is slightly reduced, but still is sufficiently great for causing the diaphragm to be firmly sucked onto the perforated plate, so that the remaining holes therein still are closed. When the float continues to rise, the diaphragm gradually is lifted from the perforated plate, whereby the holes gradually are exposed from the outer edge of the perforated plate to its centre, as shown in FIG. 5. When the float additionally is lifted, the holes in the perforated plate are opened increasingly until finally the holes are fully exposed, and the valve diaphragm no longer is in contact with the perforated plate, as shown in FIG. 6. Due to the tension in the diaphragm produced by its bending, the diaphragm has substantially oval shape when the float is so lifted that the diaphragm not longer abuts the perforated plate. The long axis is perpendicular to the guide pin, and the short axis coincides with the axis of the guide pin. The short axis is greater than the height of the conical valve top, so that the central section of the diaphragm is located some distance below the point of the conical body. Owing to the soft and elastic state of the valve diaphragm, it can be bent during the lifting of the float, and because the valve body first exposes the small central hole at the guide pin without the diaphragm being lifted off from the perforated plate, only a very small lifting force of the float is required. The float, therefore, can be given small dimensions and a small volume, for example of the magnitude 0.2 liter. When the holes in the perforated plate are exposed fully or partially by the lifting of the float, fuel can be sucked from the overflow return tank. When the return flow decreases, the float is lowered until it again assumes its lowermost position, whereby the outlet of the overflow return tank again is closed.

Though only one embodiment has been described and shown, it is obvious that a great number of variations and modifications can be imagined within the scope of the invention idea. The valve diaphragm, for example, may be a ball-like member, provided that it is sufficiently soft and elastic to render possible a gradual opening of the holes in the perforated plate by bending the diaphragm. When using a strip as diaphragm, it can be given constant width or be provided with recesses or with tongues or webs, which interconnect the sections, of a shape different from that shown at the embodiment according to FIG. 3. The holes in the perforated plate, too, can be formed in many different ways. Instead of several small holes, one great hole can be made and be covered by a net or the like, in order to prevent the diaphragm from being firmly sucked into the hole, because then a greater lifting force from the float would be required. The hole or holes can be made alternatively directly in the bottom or lower portion of the overflow return tank. As the flexibility of the diaphragm according to the invention results in a lower required lifting force, it is not absolutely necessary to provide a special valve body, in order to effect the opening of a small hole before the lifting proper of the diaphragm commences, but such valve body often is advantageous. The member for separating gas bubbles from the incoming return fuel also can be designed in many different ways and may consist, for example, of plates with large surfaces or of the sidewalls of the receptacle. The overflow return tank can be used also for purposes other than the collection of return flow from internal combustion engines in vehicles with fuel gauges.

In the embodiment, on which the prototype of the application subject matter is based, the diaphragm 36 was made of fluorosilicone rubber. The diaphragm, of course, can be made of any other material, for example plate spring steel, which meets the requirements on the operation of the diaphragm with respect to resilience within the scope of the invention idea.

According to the invention idea, the cylindric pipe 20 may also be provided with cooling flanges for cooling the incoming return fuel.

We claim:
1. An overflow return apparatus comprising
   (a) a tank having an inlet in an upper portion thereof and an outlet in a lower portion thereof;
   (b) a float located in said tank;
   (c) valve means for controlling the flow of liquid through the outlet, said valve means connected to said float and responsive to the position of said float;
   (d) said valve means including a plate with an opening therein overlying the outlet and a diaphragm means overlying the plate for selectively sealing the opening in the plate in response to the downward movement of the float and for selectively unsealing the opening in the plate in response to the upward movement of the float whereby a pump connected to the outlet applies a suction to said diaphragm means holding the diaphragm means in sealing position with the opening in the plate, the diaphragm means (36) comprising a folded strip which comprises three subsequently arranged sections (37, 38, 39), each end section of which is connected to the central section by a narrow togue (40).

2. The overflow return apparatus as defined in claim 1, characterized in that the folded strip (36) forms a substantially oval-shaped loop, the long axis of which is perpendicular to the direction of movement of the float (30).

3. The overflow return apparatus as defined in claim 1 in which the float (30) is provided with a guide pin (31) located beneath the float and projecting in the longitudinal direction of the float, the guide pin (31) passes through the oval-shaped diaphragm strip (36) and projects out in a hole (42), the diameter of which slightly exceeds the diameter of the guide pin, and a conical valve body (31a) with downward facing point is provided on that portion of the guide pin (31) which passes through the loop formed by the diaphragm, and the height of the conical valve body (31a) is smaller than the short axis of the oval-shaped diaphragm loop when the diaphragm strip (36) is in free position.

4. The overflow return apparatus as defined in claim 1 characterized in that the outlet (25) comprises a plane disc (26), which has at least one through hole (29) for the flow, and against which the diaphragm (36) in plane state abuts when the float (30) is in its lowermost position and that the plane disc is provided with a hole (28) for the guide pin (31).

5. The overflow return apparatus as defined in claim 4 characterized in that the plane disc (26) is provided with a central hole (28) and a plurality of ring holes (29), which are arranged about the central hole in such a manner, that the float (30) and the diaphragm (36) can turn about the float axis without affecting the valve function.

6. The overflow return apparatus as defined in claim 5 characterized in that the float (30) has a cross-sectional area perpendicular to its direction of movement, which area is almost as large as the cross-sectional area of the receptacle (20, 21, 22) so that the gap between the inner wall of the receptacle and the float is as small as possible.

7. The overflow return apparatus as defined in claim 1 characterized in that upwardly in the tank a flow-directing member (44) is located, and the inlet of the tank is directed to said member, so that the incoming flow flows downward along the member and thereby is freed from gas bubbles.

8. The overflow return apparatus as defined in claim 7, characterized in that the flow-directing member consists of a pipe (44) of a fine-meshed net, which in the lower portion of the overflow return tank is connected to the wall (20) of the receptacle and which tapers in the upper portion of the overflow return tank, so that the upper end of the pipe is located inside of and closely beneath the mouth of the inlet (23).

9. The overflow return apparatus of claim 1 further including a flow directing means for directing the flow from the inlet to the lower portion of the tank and for preventing interference of the flow with said float.

10. The overflow return apparatus of claim 9 wherein said flow directing means is comprised of a conically shaped mesh member.

* * * * *